United States Patent
Macri et al.

(10) Patent No.: US 6,974,134 B1
(45) Date of Patent: Dec. 13, 2005

(54) FOLDING HANDLE ASSEMBLY FOR A VEHICLE

(75) Inventors: Gregory G. Macri, Elkhart, IN (US); James D. Lark, II, West Bloomfield, MI (US)

(73) Assignee: ASC Industries, Inc., Elkhart, IN (US)

( * ) Notice: Subject to any disclaimer, the term of this patent is extended or adjusted under 35 U.S.C. 154(b) by 0 days.

(21) Appl. No.: 10/760,786

(22) Filed: Jan. 20, 2004

(51) Int. Cl.$^7$ ................................................ B60J 7/00
(52) U.S. Cl. ...................................... 276/1.02; 16/412
(58) Field of Search .......................... 296/1.02; 16/412, 16/438, 455, 900

(56) References Cited

U.S. PATENT DOCUMENTS

| | | | |
|---|---|---|---|
| 579,277 A | * | 3/1897 | Lord et al. .................... 403/96 |
| 1,179,286 A | | 4/1916 | Crimmel |
| 1,435,110 A | | 11/1922 | Efford |
| 1,523,495 A | * | 1/1925 | Silberman ................... 362/501 |
| 1,629,456 A | * | 5/1927 | Pellegrini ................... 362/501 |
| 1,796,344 A | | 3/1931 | Pleiss |
| 2,411,448 A | | 11/1946 | McLean |
| 2,437,647 A | | 3/1948 | McLean |
| 3,082,473 A | * | 3/1963 | West ........................... 16/445 |
| 3,773,375 A | * | 11/1973 | Nehls .......................... 37/268 |
| 3,847,336 A | | 11/1974 | Morris et al. |
| 3,929,228 A | | 12/1975 | Margolin et al. |
| 4,029,352 A | | 6/1977 | Evans |
| 4,068,347 A | * | 1/1978 | Johnson et al. ............... 16/438 |
| 4,261,550 A | | 4/1981 | Gregory |
| 4,297,963 A | * | 11/1981 | Beacom ................. 114/230.29 |
| 4,335,862 A | | 6/1982 | Sherman |
| 4,517,700 A | * | 5/1985 | Pinto ........................... 15/105 |
| 4,645,224 A | * | 2/1987 | Poganski ................. 280/47.17 |
| 4,720,116 A | | 1/1988 | Williams et al. |
| 4,770,579 A | * | 9/1988 | Aksamit ..................... 410/150 |
| 4,823,910 A | | 4/1989 | Day |
| 4,976,455 A | * | 12/1990 | Brammer et al. ........... 280/762 |
| 5,018,405 A | * | 5/1991 | Chiu ........................... 74/529 |
| 5,024,420 A | | 6/1991 | Downing |
| 5,028,029 A | | 7/1991 | Beck et al. |
| 5,076,547 A | | 12/1991 | Osterholm |
| 5,078,276 A | | 1/1992 | Rogge et al. |
| 5,116,025 A | | 5/1992 | Kiniry |
| 5,297,010 A | * | 3/1994 | Camarota et al. ........... 362/501 |
| D374,581 S | | 10/1996 | Kiniry |
| 6,135,621 A | * | 10/2000 | Bach et al. ................. 362/399 |
| 6,216,317 B1 | * | 4/2001 | Chen ........................... 16/430 |
| 6,375,146 B1 | | 4/2002 | Painchaud |
| 6,425,572 B1 | | 7/2002 | Lehr |

(Continued)

OTHER PUBLICATIONS

TJ Trailers "Lend-A-Hand"http://www.tjtrailers.com/store/product13496.html (Jun. 8, 2004).*

(Continued)

*Primary Examiner*—H. Gutman
(74) *Attorney, Agent, or Firm*—Van Dyke, Gardner, Linn & Burkhart, LLP (57) ABSTRACT

A handle assembly that pivotally mounts a handle adjacent to an opening of a vehicle includes a bracket and an end portion or cap portion of a handle. The end portion and bracket engage one another to substantially secure the handle in either an in use position or a storage position. The end portion and bracket include projections and correspondingly formed recesses that engage one another to limit or substantially preclude pivotal movement of the handle without first raising the handle to disengage the handle and cap portion from the bracket. The handle assembly may include an illumination source to provide illumination of the handle in low lighting conditions.

30 Claims, 7 Drawing Sheets

U.S. PATENT DOCUMENTS

| | | | |
|---|---|---|---|
| 6,553,629 B2 * | 4/2003 | Grady et al. | 16/444 |
| 6,581,245 B2 * | 6/2003 | Jen | 16/408 |
| 6,676,278 B2 * | 1/2004 | Striebel et al. | 362/267 |
| 2003/0029974 A1 | 2/2003 | Marshall et al. | |

OTHER PUBLICATIONS

The Sportsman's Guide (Jun. 8, 2004) http://www.sportsmanguide.com/cb/cb/asp?a=33791.*

Dyers RV—Acar Assist Handles-Aluminum (Jun. 8, 2004) http://www.dyersonline.com/merchant.mvc?Screen=PROD&Product_Code=31-1558&Category_Code=Hard.*

Camping World (Jun. 8, 2004) http://www.campingworld.com/browse/skus/index.cfm?skunum=17519.*

Lend-A-Hand Installation Instructions, Apr. 11, 1996 (2 pages).

* cited by examiner

FOLDING HANDLE ASSEMBLY FOR A VEHICLE

FIELD OF THE INVENTION

The present invention relates generally to assist handles or rails for recreational vehicles and the like and, more particularly, to a fold away assist handle or rail assembly which is mountable to a side of a recreational vehicle or the like.

BACKGROUND OF THE INVENTION

Fold away assist rails or handles are known or are mountable to a side of a recreational vehicle or the like via securing brackets to the vehicle with suitable fasteners. The handle or railing is foldable between a stored position, where the handle is positioned generally along a side of the vehicle, and an in use position, where the handle extends outwardly from the vehicle for a person to grasp the handle as they are entering or leaving the recreational vehicle. The handle is pivotally mounted to a pair of brackets via a pivot pin at each end of the handle. The brackets are mounted to or installed at the side of the vehicle. Typically, the brackets are biased toward the storage or in use position via a spring biasing the handle into a receiving channel of the bracket. The handle or rail is typically a cylindrical shaped or tubular shaped rail and rests partially within a semi-cylindrical channel in the bracket and is biased or urged toward the recess or channel via the spring. Because the handle is generally cylindrical, the portions of the handle that engage the channel are curved and thus allow the handle to raise upward along the sides of the channels when the handle is pushed toward one side or the other relative to the brackets. The handles thus may be inadvertently moved or pushed out of their in use position to their stored position, such as if a person leans against the handles or the like.

Therefore, there is a need in the art for a handle assembly that overcomes the shortcomings of the prior art.

SUMMARY OF THE INVENTION

The present invention provides a handle assembly for a vehicle, such as a recreational vehicle or the like, that provides a positive stop or lock to positively retain the handrail or handle in either a storage or stored position, where the handrail is positioned along the side of the vehicle, or an in use position, where the handrail extends outward from the vehicle for a user to grasp while entering or exiting the vehicle. The present invention may also provide an illumination source at the handle to illuminate the handle or handrail to assist a person in seeing and using the handrail in darkened conditions, such as night time conditions or the like.

According to an aspect of the present invention, a handle assembly for mounting to a surface of a vehicle includes a handrail and a bracket. The handrail is formed of a tubular member and has a curved cross section. The handrail has an end cap that is joined with the tubular member and that is selectively engagable with the bracket in first and second positions relative to the bracket. The handrail is selectively movable to disengage the end cap from the bracket and is pivotable when the end cap is disengaged from the bracket to move the end cap between the first position, where the handrail is positioned along the surface of the vehicle, and the second position, where the handrail extends outward from the surface of the vehicle. The end cap limits pivotal movement of the handrail when the end cap is engaged with the bracket and the handrail is substantially positively fixed or retained in the first or second position relative to the bracket when the end cap is engaged with the bracket.

The end cap of the handrail may include at least one projection for engaging at least one recess of the bracket. The projection may have at least one wall for engaging a corresponding wall of the recess of the bracket, such that the walls engage one another to substantially positively retain the end cap relative to the bracket in the first or second position. The walls may be generally parallel to the pivot axis of the handrail to limit pivotal movement of the handrail when the walls are engaged. The handrail may be raisable or movable along the pivot axis relative to the bracket to disengage the projection from the recess and may be pivotable about the pivot axis between the first and second positions when the handrail is raised or moved along the pivot axis and the projection is disengaged from the recess. The handle assembly may include a pivot pin extending at least partially through the bracket and the end cap and defining the generally vertical pivot axis. The handle assembly may include a biasing member along the pivot pin that biases the end cap toward engagement with the bracket and that biases or urges the projection into engagement with the recess.

Optionally, the handle assembly may include at least one illumination source that is operable to illuminate at least a portion of the handle assembly. The illumination source may be positioned at the bracket and may be operable to direct illumination through a transparent or partially transparent panel of the bracket.

According to another aspect of the present invention, a handle assembly for mounting to a surface of a vehicle includes a handrail and a bracket. The handrail has an end portion that has a first engaging face and the bracket has a second engaging face. The handrail is pivotable relative to the bracket about a pivot axis. The first and second engaging faces are selectively engagable in first and second positions. The handrail is selectively movable to disengage the first engaging face from the second engaging face and is pivotable about the pivot axis when the first and second engaging faces are disengaged to move the handrail between the first position, where the handrail is positioned along the surface of the vehicle, and the second position, where the handrail extends outward from the surface of the vehicle. The first and second engaging faces are generally parallel to the pivot axis to substantially positively retain the handrail relative to the bracket when the engaging faces are engaged.

One of the end portion and the bracket may comprise at least one projection and the other of the end portion and the bracket may comprise at least one recess for receiving the at least one projection. The projection and the recess may comprise the engaging faces. The handrail may be raisable to disengage the projection from the recess. The handle assembly may include a biasing member that biases the end portion toward engagement with the bracket.

Therefore, the handle assembly of the present invention provides a positive stop or locking mechanism to substantially positively retain the handrail in either the storage position or in use position relative to the bracket affixed to the wall of the vehicle. The handle assembly of the present invention thus limits or substantially precludes inadvertent movement of the handrail from one position to the other. In order to move the handle to the in use or to the storage position, the handrail may be raised upward or otherwise moved along its pivot axis to disengage the end of the handrail from the bracket. If the handrail is pushed sideways without such raising or movement, the handrail and bracket function to limit or substantially preclude pivotal movement of the handrail relative to the bracket. Also, the handle assembly may include a light or illumination source to provide illumination to the handrail to assist a person in using the handrail in darkened conditions.

These and other objects, advantages, purposes and features of the present invention will become apparent upon review of the following specification in conjunction with the drawings.

DESCRIPTION OF THE PREFERRED EMBODIMENTS

Figure 1:
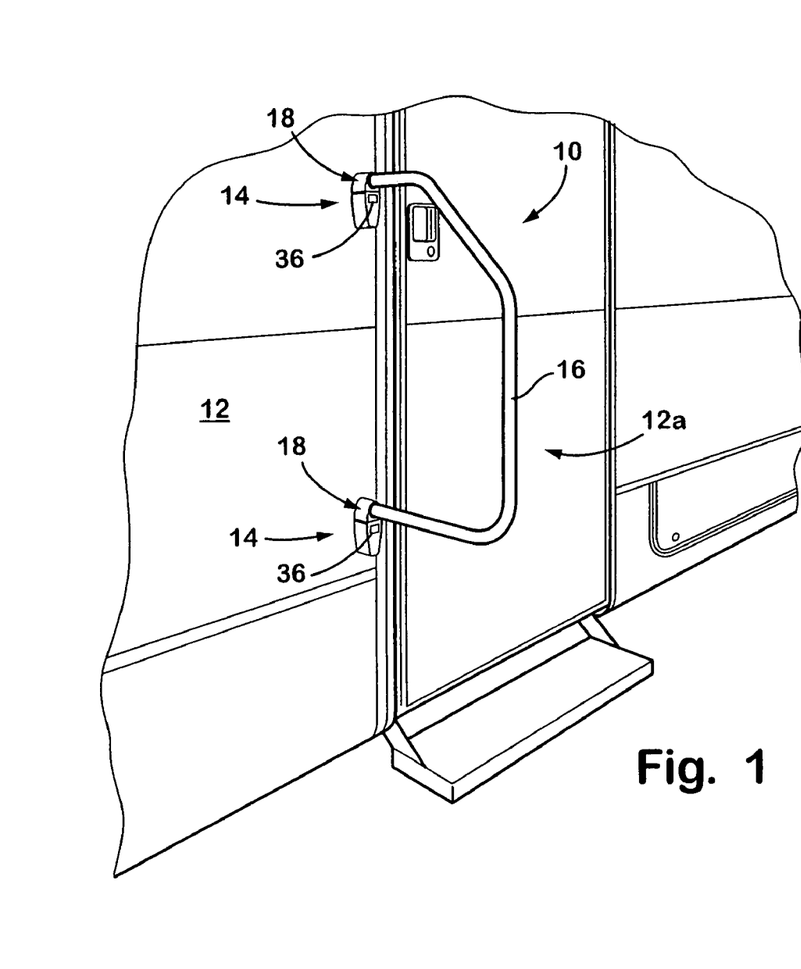
FIG. 1 is a perspective view of the handle assembly mounted at the side of a vehicle in accordance with the present invention, with the handrail in its in use position and extending outward from the side of the vehicle.
Figure 2:
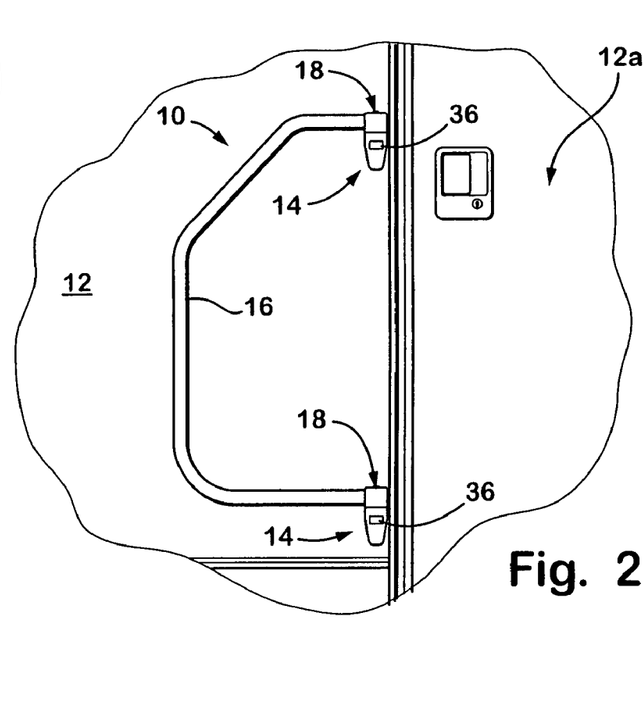
FIG. 2 is a side elevation of the vehicle of FIG. 1, with the handrail in its storage position and folded alongside the vehicle.

Referring now to the drawings and the illustrative embodiment depicted therein, a fold away handrail or handle assembly 10 is mountable to a side or surface of a vehicle 12 adjacent to a door other opening 12a in the vehicle 12 (FIGS. 1 and 2). The handle assembly 10 includes a pair of brackets 14 and a handrail or handle 16 pivotally mounted at each end 16a to brackets 14. As can be seen in FIGS. 1 and 2, handle 16 is selectively pivotable between an in use position (FIG. 1) where the handle extends outwardly from the side of the vehicle for a person to grasp and use while exiting or entering the vehicle, and a fold away or stored position (FIG. 2), where the handle is folded along the side of the vehicle when it is not in use. The ends 16a of handle 16 positively engage brackets 14 to positively retain the handle in either the in use position or the stored position, and limit or substantially preclude inadvertent moving or pivoting of the handle to the other position, as discussed below.

Figure 5:
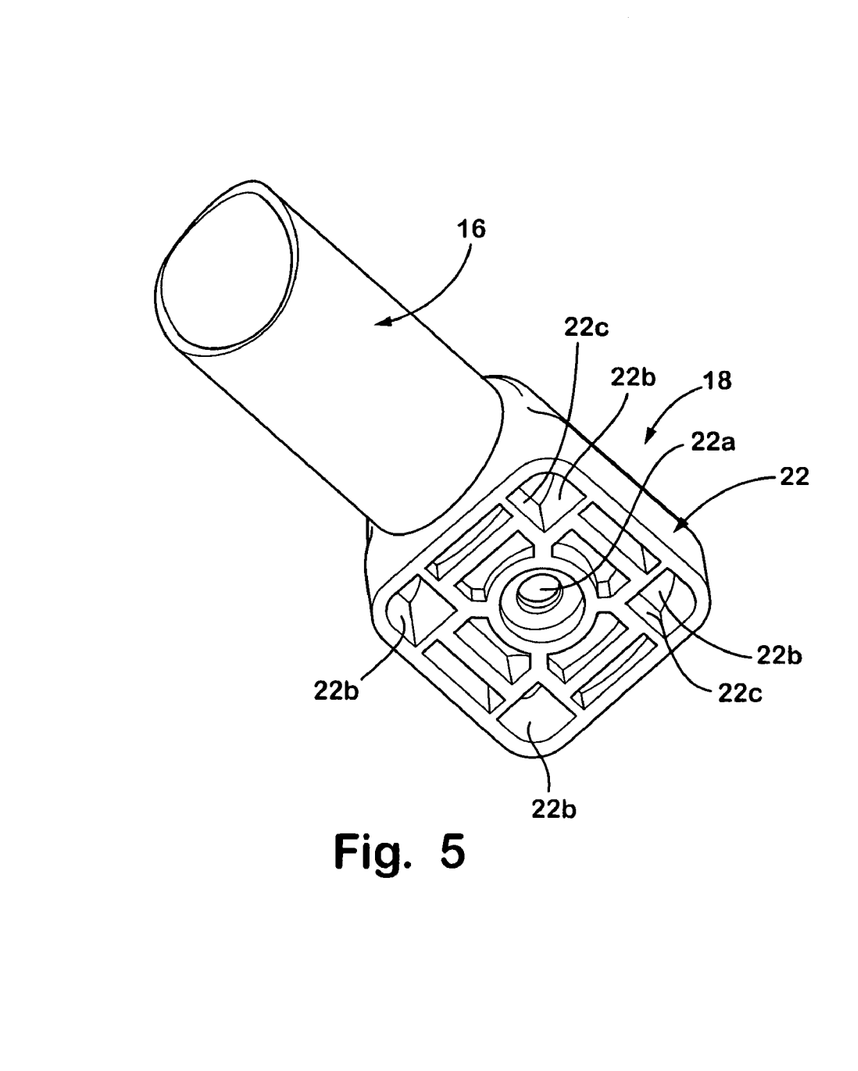
FIG. 5 is a lower perspective view of the end of the handrail of the handle assembly of FIG. 3.
Figure 6:
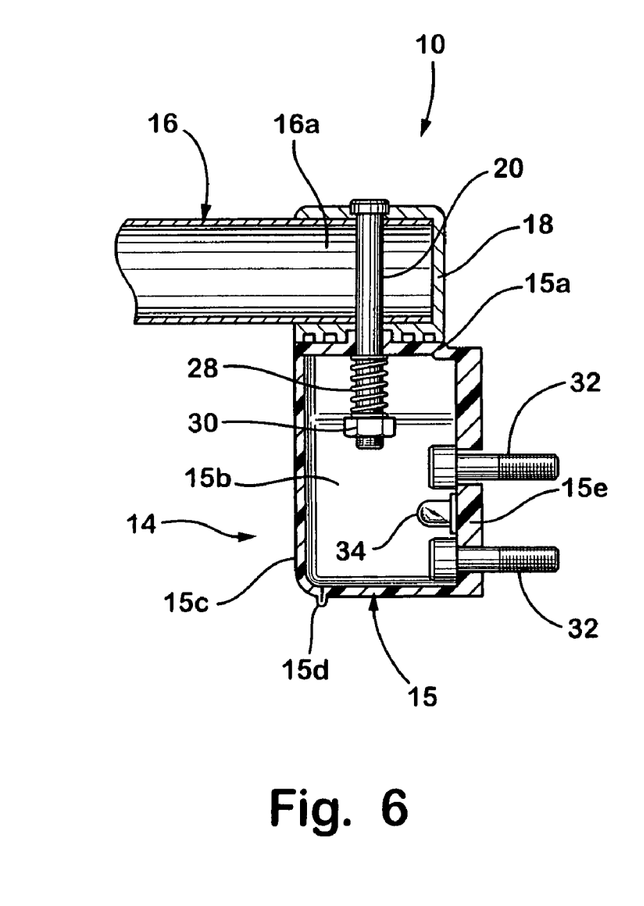
FIG. 6 is a sectional view of the end of the handrail and bracket, taken along the line VI—VI in FIG. 3.
Figure 7:
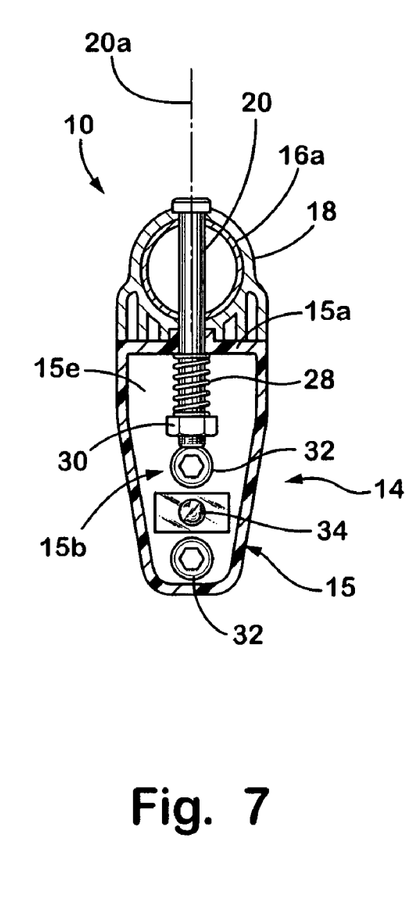
FIG. 7 is a sectional view of the end of the handrail and bracket, taken along the line VII—VII in FIG. 3.
Figure 8:
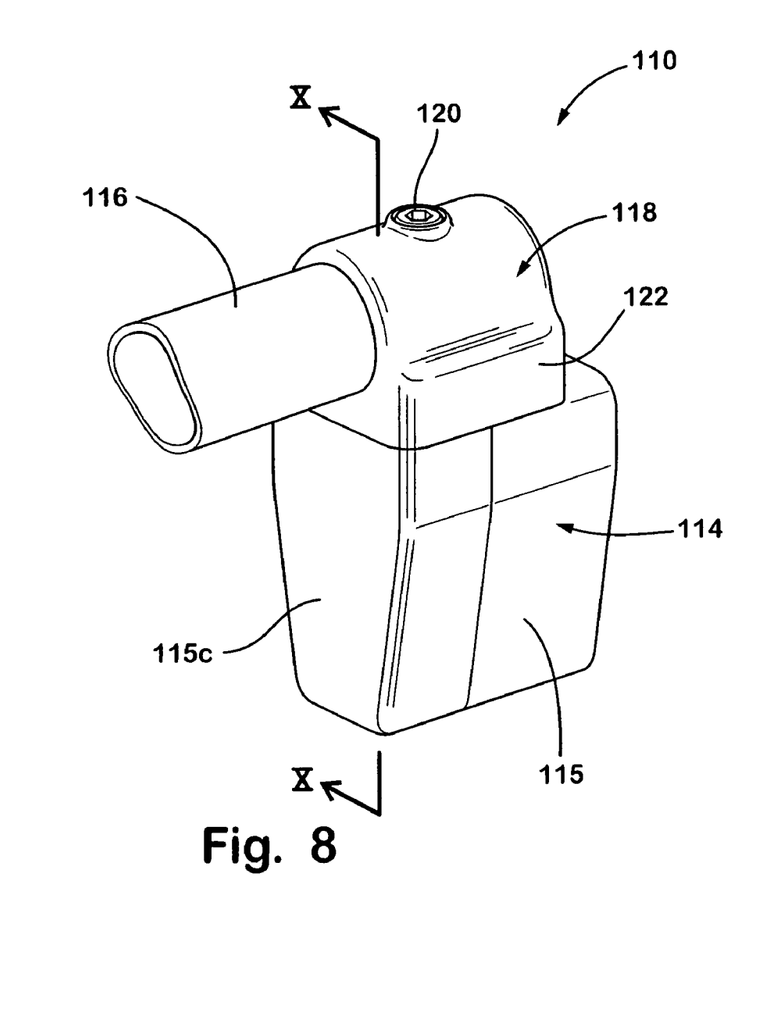
FIG. 8 is a perspective view of an end of a handrail and a bracket of another handle assembly in accordance with the present invention.

Handle 16 is curved and may include an end portion or cap portion or end cap 18 at each end 16a. Each cap portion 18 is pivotally mounted to a respective bracket 14 to pivotally mount the handle to the brackets. Cap portion 18 may comprise a plastic or polymeric material and may be joined or attached to the respective end of handle 16. As shown in FIGS. 6 and 7, cap portion 18 may be retained to the bracket via a pivot pin or fastener 20. Pivot pin 20 extends through cap portion 18 and through the end portion 16a of handle 16 and, thus, may retain or secure cap portion 18 at end portions 16a of handle 16. As can be seen in FIG. 5, cap portion 18 includes a base portion 22 that includes an opening 22a for receiving fastener 20 therethrough and a plurality of receiving portions or recesses 22b, such as at the corners of base portion 22. Recesses 22b receive correspondingly formed projections 24 of bracket 14 to positively retain the handle 16 in the storage or in use position, as discussed below.

Figure 4:
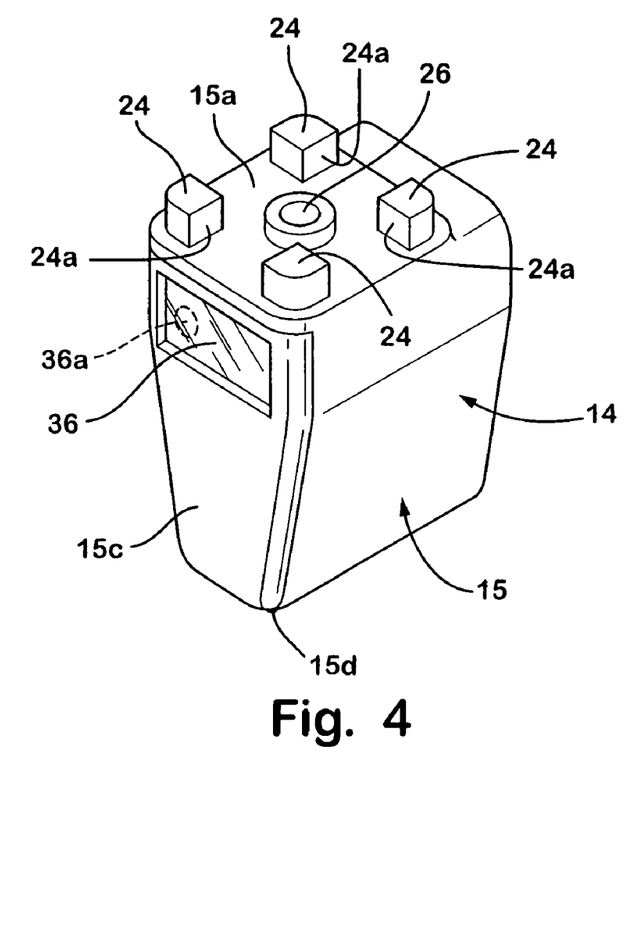
FIG. 4 is an upper perspective view of the bracket of FIG. 3.

As shown in FIG. 4, each bracket 14 may include a housing 15 with a plurality of projections 24 extending upwardly from an upper end or surface 15a of housing 15. Housing 15 may comprise a plastic or polymeric material and may be unitarily molded housing. Projections 24 may be correspondingly formed with recesses 22b to fit within recesses 22b and limit lateral or pivotal movement of recesses 22b and handle 16 relative to projections 24 and bracket 14. In the illustrated embodiment, projections 24 include generally flat faces or walls 24a for engaging corresponding generally flat walls 22c of recesses 22b in cap portion 18 of handle 16. The walls or faces are arranged to be generally parallel to the pivot axis 20a, such that the walls limit or substantially preclude pivotal movement of handrails 16 about pivot axis 20a when the walls are engaged. The flat walls or faces 24a and 22c engage or oppose one another and thus function to limit or substantially preclude pivotal movement of cap portion 18 (and thus handle 16) about pivot pin 20 relative to bracket 14, unless cap portion 18 is lifted up or raised or otherwise moved along the pivot axis 20a relative to bracket 14 to disengage the projections 24 from recesses 22b, as discussed below.

The upper portion of bracket 14 may also include an opening 26 therethrough for receiving pivot pin 20. As shown in FIGS. 6 and 7, pivot pin or bolt 20 may extend through end 16a of handle 16 and through cap portion 18 and through the upper portion 15a of bracket housing 15 into a cavity 15b defined by and within the housing 15 of bracket 14. Handle assembly 10 may include a biasing member or spring 28 positioned along pivot pin 20. Biasing member 28 may engage the upper portion 15a of the housing 15 of bracket 14 with one end, and a fastener or nut 30 or the like on pivot pin 20 with the other end, in order to provide or exert a downward force on pivot pin 20 to bias or urge the cap portion 18 downward and into engagement with projections 24 of bracket 14. As also shown in FIGS. 6 and 7, bracket housing 15 may be secured to the side walls of the vehicle 12 via a pair of fasteners 32, such as bolts, screws or the like, to mount the handle assembly to the vehicle.

Figure 3:
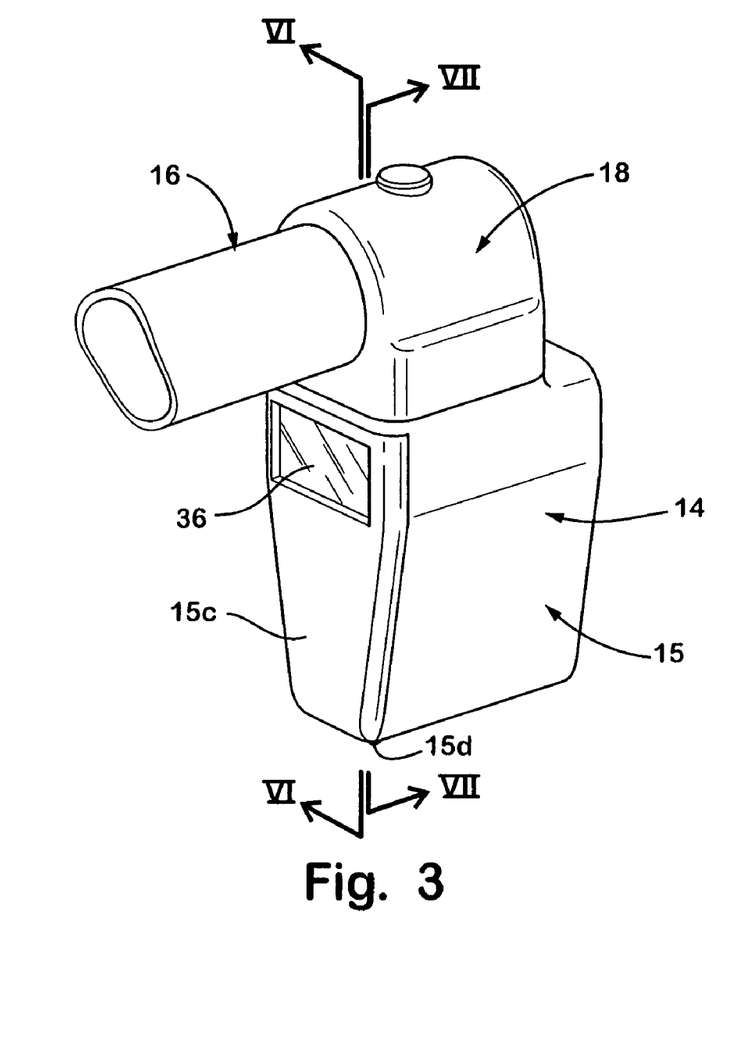
FIG. 3 is a perspective view of an end of the handrail and a bracket assembly of the handle assembly of the present invention.

As can be seen in FIGS. 3, 4 and 6, housing portion 15 includes a front cover plate or cover portion 15c. Cover plate 15c may be removably or detachedly mounted to housing 15 or may be pivotally or hingedly attached to housing 15. In the illustrated embodiment of FIG. 6, cover plate 15c is integrally formed with the housing portion 15, and may pivot between an opened and closed position about a living hinge 15d or the like. Cover plate 15c may be opened or removed to provide access to fasteners 32 for securing bracket 14 to the side walls of the vehicle 12. As can be seen in FIG. 7, fasteners 32 may be readily accessible when cover plate 15c is opened, even with handle 16 attached to bracket 14 via pivot pin 20. Although shown as having a living hinge or molded hinge 15d pivotally connecting the cover plate 15c to the housing 15 of the bracket 14, other hinge mechanisms or connections may be implemented, without affecting the scope of the present invention. For example, the cover plate may snap onto and be removable or detachable from the housing of the bracket, or may have a pivot pin connecting the cover plate to the bracket housing (such as discussed below with respect to FIGS. 12 and 13), or any other means for movably or detachably connecting or mounting the cover plate to the bracket, without affecting the scope of the present invention.

Optionally, handle assembly 10 may include an illumination source 34, such as an incandescent bulb or light emitting diode or the like, positioned within housing 15 of bracket 14 and operable to provide illumination to at least a portion of the handle 16 to assist the user in seeing and using the handle in darkened or night time lighting conditions. In the illustrated embodiment, illumination source 34 may be positioned at a rear or inner wall 15e of housing 15 that is generally positioned against the side wall of the vehicle 12 when bracket 14 is mounted to the vehicle 12. The illumination source 34 may connect directly to an electrical system or power source of the vehicle, or may be battery operated or otherwise powered to selectively or continuously provide illumination to the handle, without affecting the scope of the present invention. A transparent or semi-transparent panel 36 may be provided at housing 15, such as at cover plates 15c, to allow the illumination from illumination source 34 to be projected outward from bracket 14 and at or generally toward handle 16.

The illumination source may be selectively operable to provide illumination when desired, such as when the light levels around the handle assembly darken, or when the handle assembly is moved to its in use position, or any other situation where illumination may be desired. The illumination source may be manually activated and/or deactivated or may be automatically activated and/or deactivated in response to the surrounding light levels or position of the handle or the like, without affecting the scope of the present invention.

The panel 36 may be generally transparent or may be formed to provide an image 36a, such as an icon or logo or indicia or character or text that may be backlit by illumination source 34 when the illumination source 34 is activated. The handle assembly of the present invention thus may provide a backlit image that may correspond with or be indicative of the manufacturer of the vehicle that the handle assembly is installed on, or that may convey other indicia or information. For example, a particular panel may be selected and attached to or snapped into the cover plate 15c to provide the appropriate icon or logo or the like that corresponds to the respective vehicle that the handle assembly is mounted to. The handle assembly thus may be customized for a particular vehicle or may otherwise be customized to provide other backlit indicia or iconistic display or image, as may be desired for the particular application of the handle assembly.

Accordingly, when handle assembly 10 is mounted to the vehicle 12, handle 16 and cap portions 18 may be selectively pivoted relative to bracket 14, and may be substantially secured or retained in either the storage or in use position via engagement of projections 24 of brackets 14 and recesses 22b of cap portions 18. The flat walls of the projections and recesses are generally or substantially parallel to the pivot axis and thus function to limit and substantially preclude pivotal movement of cap portion 18 relative to bracket 14 when projections 24 are engaged with recesses 22b. In the illustrated embodiment, the walls or faces are generally vertical and the pivot pin is generally vertical, such that the handrail may be raised generally vertically or otherwise moved along the pivot axis to disengage the projections from the recesses. However, the faces and pivot pin may be otherwise arranged, without affecting the scope of the present invention. Because the engaging faces are oriented generally parallel to the pivot axis, pivotal movement of the handrail about the pivot axis is substantially precluded when the faces are engaged. Pushing laterally against the handrail thus does not result in the face of the handrail riding upward toward disengagement from the face of the bracket, such as may occur with the cylindrical surfaces of known handle assemblies. Thus, in order to pivot handle 16 from one position to the other, handle 16 must be raised upwardly or otherwise moved along the pivot axis to disengage the recesses 22b of cap portions 18 from the projections 24 of brackets 14. Once the handle has been pivoted to the desired location, biasing member or spring 28 functions to bias or urge the cap portions 18 and recesses 22b downward into engagement with the projections 24 to substantially lock or retain the handle in the desired position. The handle assembly of the present invention thus substantially precludes inadvertent pivoting or moving of the handle relative to the brackets, such that when the handle is positioned in the in use position, a person may grasp the handle and may even lean against the handle, while the handle remains secured or retained in its in use position.

Figure 14:
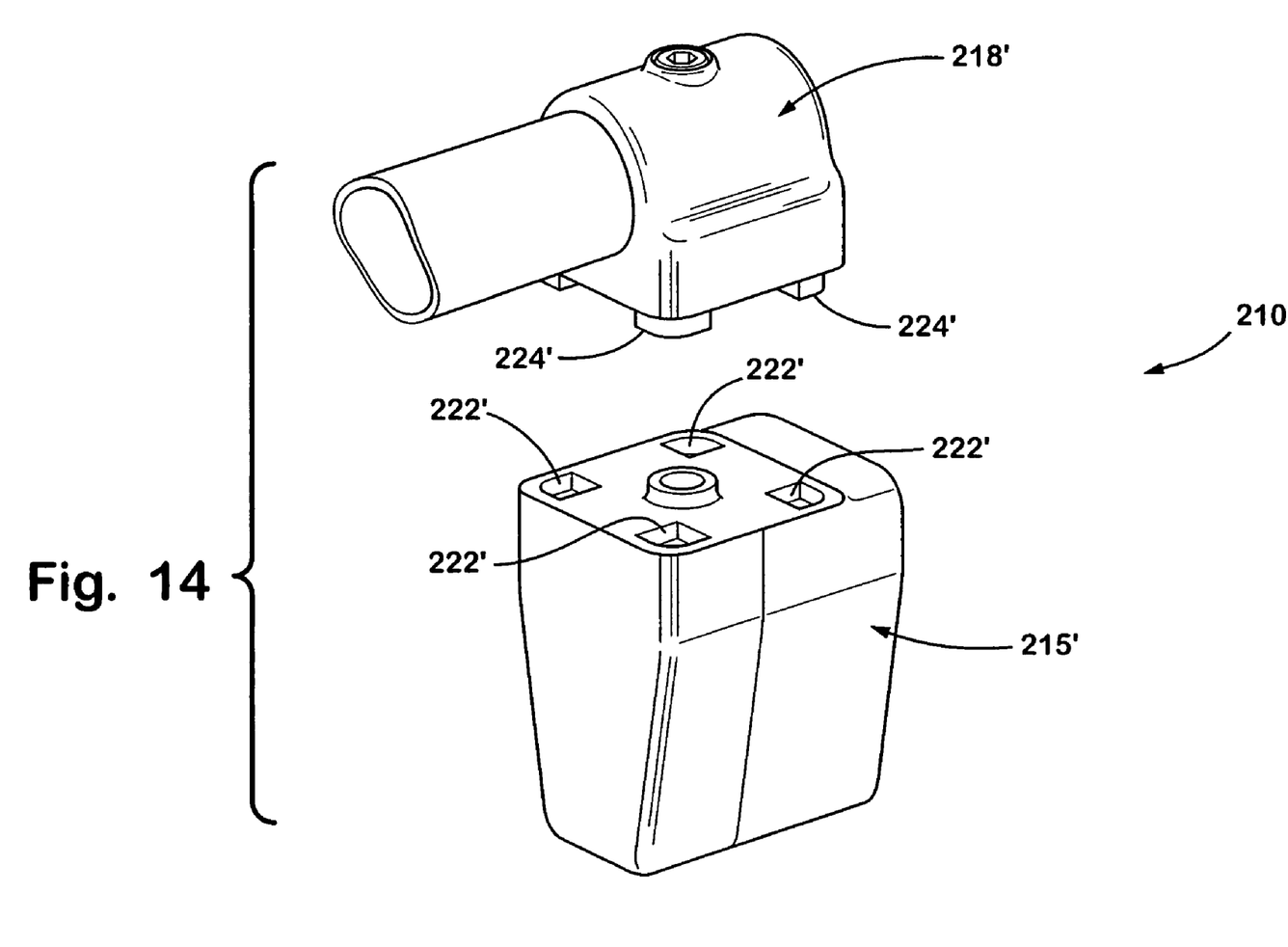
FIG. 14 is an exploded perspective view of another handle assembly in accordance with the present invention, with the projections on the cap portion and the recesses on the housing portion.

Although shown as having the projections protruding upward from the bracket and the recesses recessed within the cap portion of the handle, clearly the cap portion may include such projections, while the upper portion of the bracket may include the recesses, without affecting the scope of the present invention. For example, and with reference to FIG. 14, a handrail assembly 210' may include projections 224' projecting from a cap portion 218' for engaging recesses 222' of a housing portion 215'. Also, although shown as having four such projections and recesses, other numbers or shapes or forms of recesses and projections may be provided at either the cap portion and/or bracket, without affecting the scope of the present invention. For example, it is envisioned that a single, centrally located and non-circular projection may extend from the cap portion or bracket, while a single correspondingly formed and located recess may be formed in the bracket or cap portion to limit pivotal movement of the handle while the projection is engaged in the recess. The shape of the projection and recess may be selected to provide a desired amount of rotation or pivotal movement of the handle between locked positions. For example, the projection and recess may be generally square-shaped to provide approximately a 90 degree pivot range between the in use position and the storage position. Other shapes may be implemented to provide other pivotal ranges without affecting the scope of the present invention.

Figure 9:
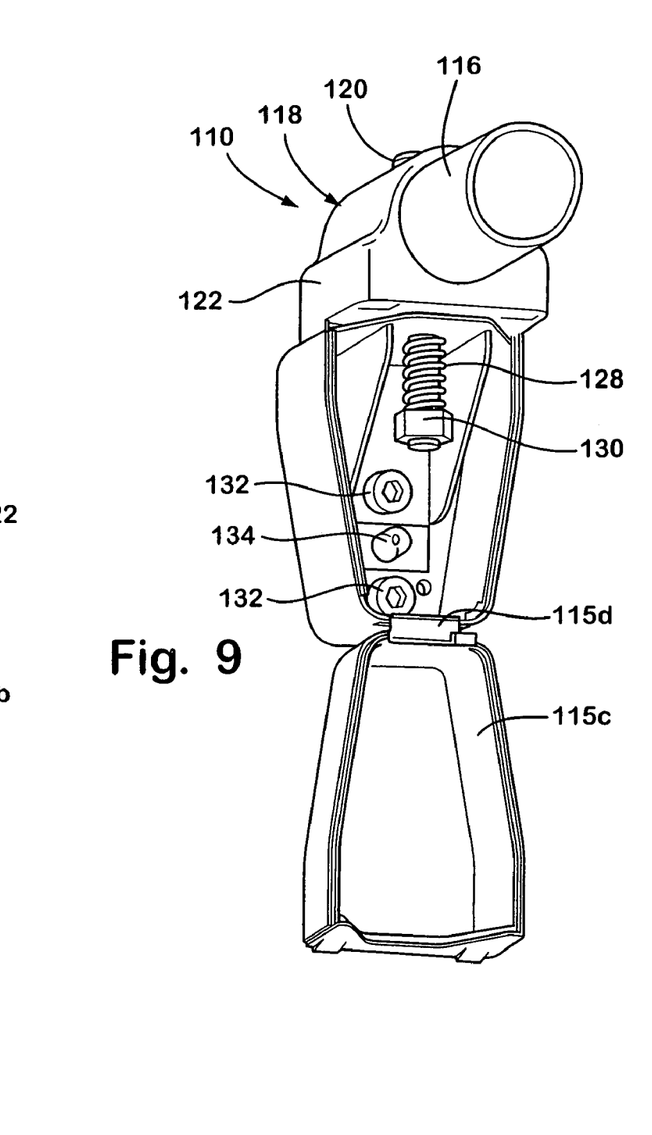
FIG. 9 is another perspective view of the end of the handrail and bracket of FIG. 8, with the cover to the bracket being opened.
Figure 10:
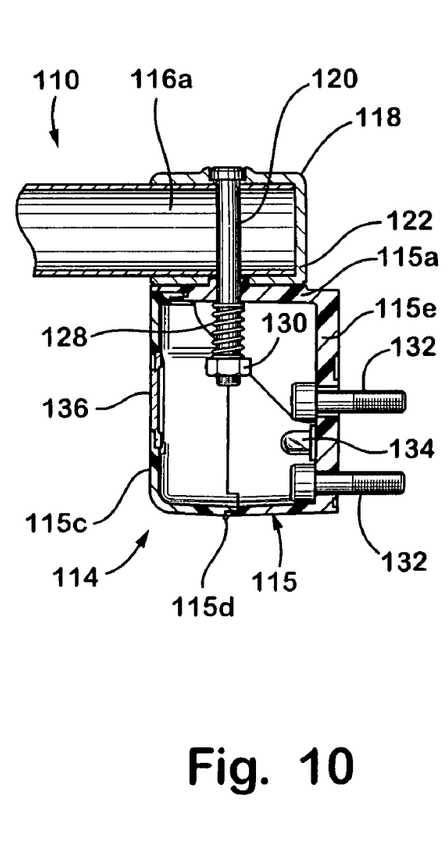
FIG. 10 is a sectional view of the end of the handrail and bracket, taken along the line X—X in FIG. 8.
Figure 11:
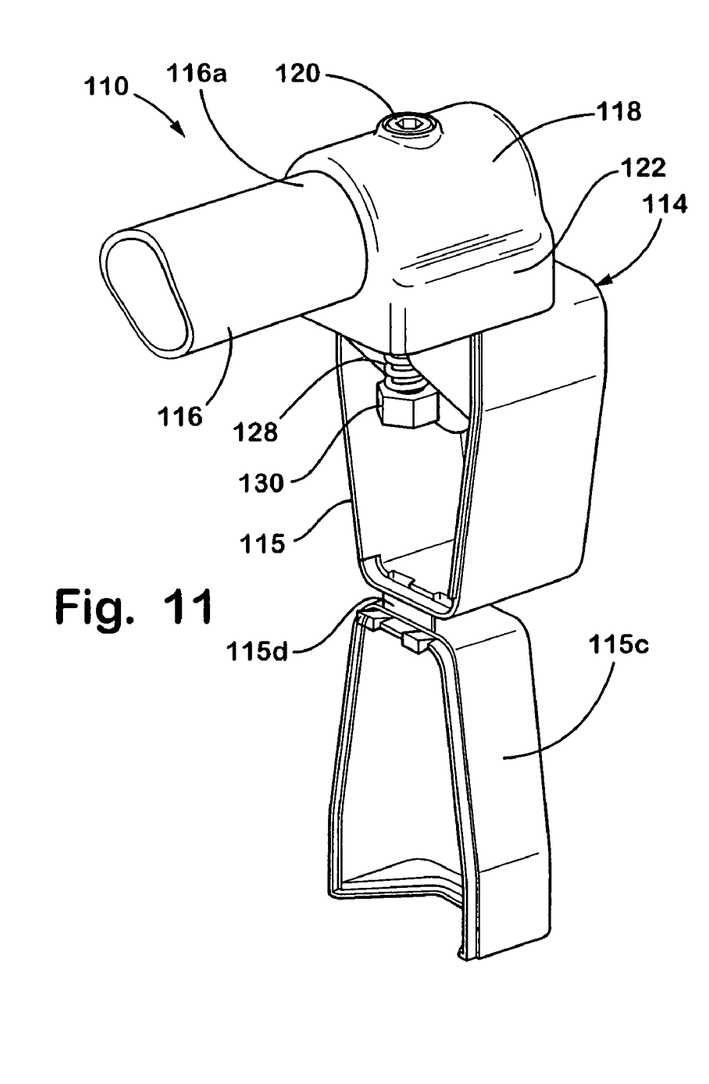
FIG. 11 is another perspective view of the handle assembly, shown with the bracket cover opened similar to FIG. 9.

Referring now to FIGS. 8–11, another handle assembly 110 in accordance with the present invention is shown and includes a handle 116, a cap portion 118 and a bracket 114, similar to handle assembly 10 discussed above. Handle assembly 110 is substantially similar to handle assembly 10 discussed above, such that a detailed description of the handle assembly will not be repeated herein. Suffice it to say that cap portion 118 includes a projection or recess (not shown in FIGS. 8–11) that engages a correspondingly formed recess or projection (also not shown in FIGS. 8–11) in an upper portion of bracket 114, similar to the projections and recesses discussed above. However, and as can be seen in FIGS. 9 and 11, bracket 114 includes a cover plate 115*c* that extends partially around the sides of the bracket housing 115, such that the projections or recesses of the upper portion of the bracket may be positioned toward the rear of the bracket, and may not be included at the outer or front portion of the bracket where the cover plate 115*c* is located. Cap portion 118 may still include the projections or recesses at each of the corners of the base portion 122 of cap portion 118 for engaging the recesses or projections of bracket 114 in different positions of the cap portion 118 relative to bracket 114. Components of handle assembly 110 that are similar or common with the corresponding components of handle assembly 10, discussed above, are shown in FIGS. 8–11 with similar reference numbers as in FIGS. 1–7, but with 100 added to each of the reference numbers.

Figure 12:
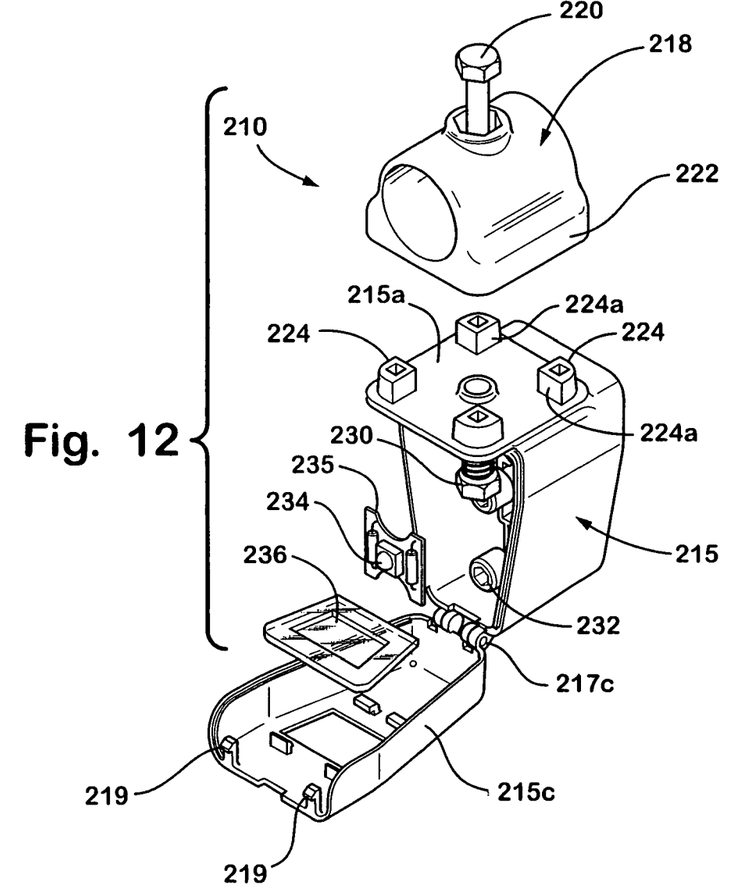
FIG. 12 is an exploded perspective view of another handle assembly in accordance with the present invention, showing the bracket and end portion of a handrail.
Figure 13:
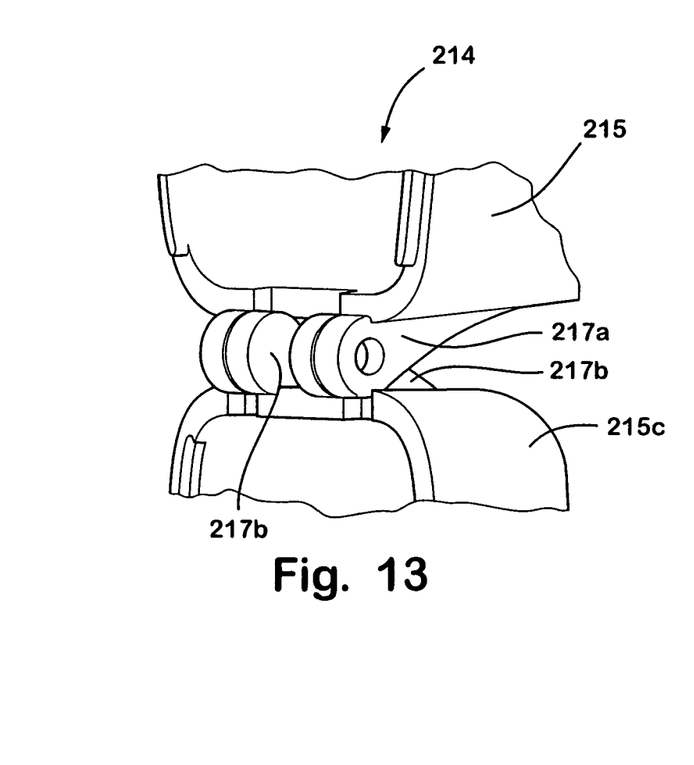
FIG. 13 is an enlarged perspective view of the hinge of the bracket of FIG. 12

With reference to FIGS. 12 and 13, another bracket assembly 210 is shown that is substantially similar to bracket assemblies 10, 110. Because bracket assembly 210 is substantially similar to bracket assembly 110 and bracket assembly 10, discussed above, a detailed discussion of the bracket assemblies will not be repeated herein. The components of bracket assembly 210 that are similar or common to the components of the previously discussed bracket assemblies are shown in FIGS. 12 and 13 with similar reference numbers to those of FIGS. 1–11, but with 200 added to the reference numerals. As can be seen in FIGS. 12 and 13, the cover plate 215*c* of housing 215 is hingedly secured or mounted to the housing 215 of bracket 214. Housing 15*a* 215 of bracket 214 includes a pair of hinge members or tabs 217*a* extending from a bottom portion of the housing, while cover plate 215*c* includes a pair of hinge members or tabs 217*b* extending therefrom and generally correspondingly formed with the hinge members 217*a* of housing 215. The cover plate 215*c* thus may be hingedly or pivotally secured to the housing 215 of bracket 214 via a pivot pin or axle member 217*c* extending through hinge members 217*a* and 217*b*. The cover plate 215*c* may include clasps or snaps or locking tabs 219 for snapping or otherwise securing cover plate 215*c* in a closed orientation relative to housing 215.

As can be seen in FIG. 12, the upper portion 215*a* of housing 215 may extend over the cover plate 215*c* such that the forward or outer portion of the upper portion 215*a* may include projections 224, similar to the upper portion 15*a* of housing 15 of bracket 14, discussed above. Cap portion 218 thus may include the correspondingly formed recesses (not shown in FIGS. 12 and 13) for receiving projections 224, as discussed above.

As also shown in FIG. 12, the illumination source 234 may be attached to or incorporated into a circuit board 235, which may be mounted to or positioned at and within the housing 215 of bracket 214. Circuit board 235 may include a control or circuitry for activating/deactivating illumination source 234, such as in response to the surrounding lighting conditions or the like, such as described above. The cover plate 215*c* may receive a transparent or partially transparent panel 236 for illumination from illumination source 234 to pass through to illuminate the handle and/or to back light an icon or indicia on the panel, as discussed above. As can be seen in FIG. 12, the panel 236 may be removably attached to the cover plate 215*c* to allow the transparent panel to be selectably attached or replaced as desired.

Therefore, the present invention provides a handle assembly that substantially locks or retains the handle or handrail in either an in use or storage position relative to the brackets secured to the side wall or surface of a vehicle. The projections and recesses of the bracket and cap portions limit or substantially preclude pivotal movement of the cap portions and the handle unless the handle is first raised upward or otherwise moved along the pivot axis to entirely disengage the rejections from the recesses. The substantially flat engaging walls or faces of the projections and recesses thus may limit or substantially preclude the cap portion from sliding upward and disengaging from the projections of the bracket when the handle is pushed toward one side or the other about the pivot axis without first raising the handle upward to disengage the projections from the recesses. The handle assembly of the present invention thus provides a sturdy and robust handrail that a person may grasp and lean against and push, without fear of the handle disengaging from the bracket and folding to the side of the vehicle as the person is entering or exiting the vehicle. The present invention thus provides a safe handle assembly that may limit or substantially preclude inadvertent or accidental folding or pivoting of the handrail. The present invention also provides for an illumination source to illuminate at least a portion of the handle during night time or darkened conditions to assist a person in using the handrail assembly in such conditions. The illumination source may back light an icon or indicia associated with the handle assembly manufacturer or with the vehicle manufacturer or the like.

Changes and modifications to the specifically described embodiments may be carried out without departing from the principles of the present invention, which is intended to be limited only by the scope of the appended claims, as according to the principles of patent law.

What is claimed is:

1. A handle assembly for mounting to a surface of a vehicle comprising:

a handrail, formed of a tubular member having a curved cross section, said handrail having an end cap at opposite ends of said handrail, said end caps being joined with said tubular member; and a pair of brackets, each of said end caps being selectively engagable with a respective one of said brackets in first and second positions relative to said brackets, said handrail being selectively movable to disengage said end caps from said brackets, said handrail being pivotable when said end caps are disengaged from said brackets to move said end caps between said first position, where said handrail is positioned along the surface of the vehicle, and said second position, where said handrail extends outward from the surface of the vehicle, one of (a) said end caps and (b) said brackets comprising at least one projection and the other of said end caps and said brackets comprising at least one recess for receiving said at least one projection when said end caps are engaged with said brackets in one of said first and second positions, said end caps being substantially positively retained relative to said brackets when said end caps are engaged with said brackets in said first or second position.

2. The handle assembly of claim 1, wherein, said handrail comprises a generally cylindrical handrail and said end cap comprises a plastic end cap secured at an end of said handrail.

3. The handle assembly of claim 1, wherein said at least one projection comprises at least one wall and said at least one recess comprises at least one wall, said walls being configured to engage one another to positively retain said end caps in said first or second position relative to said brackets.

4. The handle assembly of claim 3, wherein said handrail is movable along a pivot axis to disengage said walls.

5. The handle assembly of claim 3, wherein said walls are oriented substantially parallel to a pivot axis of said handle assembly.

6. The handle assembly of claim 1, wherein said at least one projection and said at least one recess are correspondingly formed to limit movement of said end caps relative to said brackets when said end caps are in one of said first and second positions.

7. The handle assembly of claim 6, wherein said handrail is movable along a pivot axis to disengage said at least one projection from said at least one recess, said handrail being pivotable about said pivot axis between said first and second positions when said at least one projection is disengaged from said at least one recess.

8. The handle assembly of claim 7 including a pivot pin extending at least partially through a respective one of said brackets and a respective one of said end caps and defining said pivot axis.

9. The handle assembly of claim 8 including a biasing member along said pivot pin that biases said respective end cap toward engagement with said respective bracket.

10. The handle assembly of claim 1, wherein said one of said end caps and said brackets comprises a plurality of projections and the other of said end caps and said brackets comprises a plurality of recesses for receiving respective ones of said projections when said end caps are in one of said first and second positions.

11. The handle assembly of claim 1 including at least one illumination source that is operable to illuminate at least a portion of said handle assembly.

12. The handle assembly of claim 11, wherein said at least one illumination source is positioned at at least one of said brackets and is operable to direct illumination through an at least partially transparent panel of said at least one of said brackets.

13. A handle assembly for mounting to a surface of a vehicle comprising:
a handrail, formed of a tubular member having a curved cross section, said handrail having an end cap joined with said tubular member; and
a bracket, said end cap being selectively engagable with said bracket in first and second positions relative to said bracket, said handrail being selectively movable to disengage said end cap from said bracket, said handrail being pivotable when said end cap is disengaged from said bracket to move said end cap between said first position, where said handrail is positioned along the surface of the vehicle, and said second position, where said handrail extends outward from the surface of the vehicle, said end cap being substantially positively retained relative to said bracket when said end cap is engaged with said bracket in said first or second position, wherein said bracket includes a housing and a cover panel, said cover panel being pivotable about a hinge portion of said housing, said panel being operable to access at least one mounting fastener of said handle assembly.

14. A handle assembly for mounting to a surface of vehicle comprising:
a handrail having an end portion, said end portion having a first engaging face; and
a bracket mountable to the surface of the vehicle, said handrail being pivotable relative to said bracket about a pivot axis, said bracket having a second engaging face, said second engaging face being substantially fixed relative to the vehicle when said bracket is mounted to the surface of the vehicle said first and second engaging faces being selectively engagable in first or second positions, said handrail being selectively movable to disengage said first engaging face from said second engaging face and being pivotable about said pivot axis when said first and second engaging faces are disengaged to move said end portion between said first position, where said handrail is positioned along the surface of the vehicle, and said second position, where said handrail extends outward from the surface of the vehicle, said first and second engaging faces being substantially parallel to said pivot axis to limit pivotal movement of said handrail relative to said bracket when said engaging faces are engaged in one of said first and second positions, wherein one of said end portion and said bracket comprises a plurality of projections and the other of said end portion and said bracket comprises a plurality of recesses for receiving respective ones of said projections when said end portion is in one of said first and second positions, said projections and said recesses comprising said engaging faces.

15. The handle assembly of claim 14, wherein one of said end portion and said bracket comprises at least one projection and the other of said end portion and said bracket comprises at least one recess for receiving said at least one projection, said at least one projection and said at least one recess comprising said engaging faces.

16. The handle assembly of claim 15, wherein said handrail is movable along said pivot axis to disengage said at least one projection from said at least one recess.

17. The handle assembly of claim 16 including a biasing member that biases said end portion toward engagement with said bracket.

18. The handle assembly of claim 14 including at least one illumination source that is operable to illuminate at least a portion of said handle assembly.

19. The handle assembly of claim 18, wherein said at least one illumination source is positioned at said bracket and is operable to direct illumination, through an at least partially transparent panel of said bracket.

20. A handle assembly for mounting to a surface of a vehicle comprising:
a handrail, said handrail comprising a generally cylindrical handrail and an end portion;
a cap portion positioned at said end portion of said handrail, said cap portion having at least one first engaging face; and
a bracket, said handrail being pivotable relative to said bracket about a pivot axis, said bracket having at least one second engaging face, said first and second engaging faces being selectively engagable when said handrail is in first or second positions, said handrail being selectively movable relative to said bracket to disengage said first engaging face from said second engaging face and being pivotable about said pivot axis when said first and second engaging faces are disengaged to move said handrail between said first position, where said handrail is positioned along the surface of the vehicle, and said second position, where said handrail extends outward from the surface of the vehicle, said first and second engaging faces being generally parallel to said pivot axis to substantially limit movement of said handrail relative to said bracket when said engaging faces are engaged, said handrail being movable along said pivot axis to disengage said engaging faces, wherein one of said cap portion and said bracket comprises a plurality of projections and the other of said cap portion and said bracket comprises a plurality of recesses for receiving respective ones of said projections when said handrail is in one of said first and second positions, said projections and said recesses comprising said engaging faces.

21. The handle assembly of claim 20, wherein one of said cap portion and said bracket comprises at least one projection and the other of said cap portion and said bracket comprises at least one recess for receiving said at least one projection when said engaging faces are engaged, said projection and said recess defining said engaging faces.

22. The handle assembly of claim 21 including a biasing member that biases said at least one projection toward engagement with said at least one recess.

23. The handle assembly of claim 20, wherein said cap portion comprises a plastic cap portion.

24. The handle assembly of claim 20 including at least one illumination source that is operable to illuminate at least a portion of said handle assembly.

25. The handle assembly of claim 24, wherein said at least one illumination source is positioned at said bracket and is operable to direct illumination through an at least partially transparent panel of said bracket.

26. A handle assembly for mounting to a surface of a vehicle comprising:

a handrail, said handrail comprising a generally cylindrical handrail and an end portion;

a cap portion positioned at said end portion of said handrail, said cap portion having at least one first engaging face; and a bracket, said handrail being pivotable relative to said bracket about a pivot axis, said bracket having at least one second engaging face, said first and second engaging faces being selectively engagable when said handrail is in first or second positions, said handrail being selectively movable relative to said bracket to disengage said first engaging face from said second engaging face and being pivotable about said pivot axis when said first and second engaging faces are disengaged to move said handrail between said first position, where said handrail is positioned along the surface of the vehicle, and said second position, where said handrail extends outward from the surface of the vehicle, said first and second engaging faces being generally parallel to said pivot axis to substantially limit movement (if said handrail relative to said bracket when said engaging faces are engaged, said handrail being movable along said pivot axis to disengage said engaging faces; and at least one illumination source that is operable to illuminate at least a portion of said handle assembly, said at least one illumination source being positioned at said bracket and operable to direct illumination through an at least partially transparent panel of said bracket, wherein said at least partially transparent panel is back lit by said illumination source to illuminate an image on said at least partially transparent panel.

27. A handle assembly for mounting to a surface of a vehicle comprising:

a handrail, said handrail comprising a generally cylindrical handrail and an end portion;

a cap portion positioned at said end portion of said handrail, said cap portion having at least one first engaging face; and a bracket, said handrail being pivotable relative to said bracket about a pivot axis, said bracket having at least one second engaging face, said first and second engaging faces being selectively engagable when said handrail is in first or second positions, said handrail being selectively movable relative to said bracket to disengage said first engaging face from said second engaging face and being pivotable about said pivot axis when said first and second engaging faces are disengaged to move said handrail between said first position, where said handrail is positioned along the surface of the vehicle, and said second position, where said handrail extends outward from the surface of the vehicle, said first and second engaging faces being generally parallel to said pivot axis to substantially limit movement of said handrail relative to said bracket when said engaging faces are engaged, said handrail being movable along said pivot axis to disengage said engaging faces, wherein said bracket includes a housing and a cover panel, said cover panel being pivotable about a hinge portion relative to said bracket housing, said cover panel being openable to access at least one mounting fastener of said handle assembly.

28. A handle assembly for mounting to a surface of a vehicle comprising:

a handrail having a cap portion at opposite ends thereof, each of said cap portions having at least one first engaging face; and a pair of brackets, said handrail being pivotable relative to said brackets about a pivot axis, each of said brackets having at least one second engaging face, said first and second engaging faces being generally parallel to said pivot axis to substantially limit movement of said handrail relative to said brackets when said engaging faces are engaged, said first and second engaging faces being engaged when said handrail is in first or second positions, said handrail being selectively movable relative to said brackets and generally along said pivot axis to disengage said first engaging faces from said second engaging faces and being pivotable about said pivot axis when said first and second engaging faces are disengaged to move said handrail between said first position, where said handrail is positioned along the surface of the vehicle, and said second position, where said handrail extends outward from the surface of the vehicle, wherein each of said brackets comprises at least one projection and each of said cap portions comprises at least one recess for receiving said at least one projection when said engaging faces are engaged, said at least one projection and said at least one recess defining respective engaging faces.

29. The handle assembly of claim 28 including a biasing member that biases said at least one projection toward engagement with said at least one recess.

30. The handle assembly of claim 28, wherein said cap portion comprises a plastic cap portion.

* * * * *

UNITED STATES PATENT AND TRADEMARK OFFICE
CERTIFICATE OF CORRECTION

PATENT NO. : 6,974,134 B1  
APPLICATION NO. : 10/760786  
DATED : December 13, 2005  
INVENTOR(S) : Gregory G. Macri and James D. Lark, II Page 1 of 1

It is certified that error appears in the above-identified patent and that said Letters Patent is hereby corrected as shown below:

Column 3:
Line 45, Insert --;-- after "Fig. 12".

Column 5:
Line 33, "plates" should be --plate--.
Line 48, Insert --,-- after "image".

Column 7:
Line 33, Delete "15a" after "Housing".

Column 8:
Line 61, Claim 2, Delete "," in second occurrence.

Column 9:
Line 64, Claim 14, Insert --a-- before "vehicle".

Column 10:
Line 6, Claim 14, Insert --,-- after "vehicle".
Line 45, Claim 19, Delete "," after "illumination".

Column 11:
Line 51, Claim 26, "(if" should be --of--.

Signed and Sealed this

Second Day of September, 2008

JON W. DUDAS  
*Director of the United States Patent and Trademark Office*